UNITED STATES PATENT OFFICE 2,422,667

SUBSTITUTED 2,4-DIARYL-PYRROLE COMPOUNDS AND METHOD OF PRODUCING SAME

Eric Paul Goodings and Maurice Arthur Thorold Rogers, Blackley, Manchester, England, assignors to Imperial Chemical Industries Limited, a corporation of Great Britain No Drawing. Application July 9, 1943, Serial No. 494,122. In Great Britain July 13, 1942

3 Claims. (Cl. 260—240)

This invention relates to the manufacture of new colouring matters.

According to the invention we provide a process for the manufacture of new colouring matters which comprises causing to interact a carbonyl compound of the formula

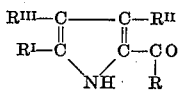

where $R^I$ and $R^{II}$ stand for aryl radicals, for example of the benzene or naphthalene series, substituted or not, the same or different, where $R^{III}$ stands for hydrogen or for a non-reactive substituent, for example an aryl-, alkyl-, alkylamino-, benzylideneamino-, or acylamino- radical, and where R stands for hydrogen, or for an alkyl-, aralkyl- or aryl-radical, or for a heterocyclic residue, with a compound, other than a 2:4-diarylpyrrole, containing one or more reactive methylene groups.

Suitable carbonyl compounds of the above formula include 5-formyl-2:4-diphenylpyrrole, 5-acetyl-2:4-diphenylpyrrole, 5-phenacetyl-2:4-diphenylpyrrole, 5-benzoyl-2:4-diphenylpyrrole, 2:2':4:4'-tetraphenyldipyrrolyl ketone, and simple analogues or derivatives of these compounds. The carbonyl compounds may be used in the form of their simple functional derivatives for example, in the form of an oxime or an anil.

Suitable compounds containing a reactive methylene group include indoxyl, thioindoxyl, 2-alkylindoles, N-methyloxindole, α:γ-diketohydrindene, 2-quinaldine methiodide, 1-methylbenzoxazole methiodide, 1-methyl-benzthiazole methiodide, 1:3:3-trimethyl-2-methylene-dihydroindole ("Fischers' Base"), 1-phenyl-3-methyl-5-pyrazolone, cyanacetic ester, chloroacetonitrile, phenylsulphonyl-acetonitrile, 2:4-dinitrotoluene, N-phenylrhodamine, barbituric acids, sulphazones, 2:4-dihydroxyquinolines, dihydroresorcinol, benzyl cyanide, cyanoacetophenone, desoxybenzoin, α-naphthol, 2-keto-2:3-dihydrobenzthiazine and 3:3'-dinitro-4:4'-dimethylstilbene.

The formation of the new colouring matters may be represented, in equation form, as follows:

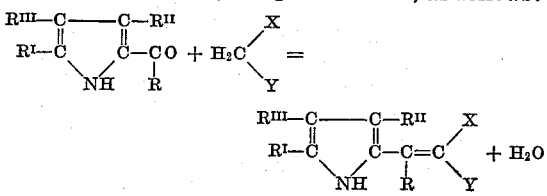

where R, $R^I$, $R^{II}$ and $R^{III}$ have the significance given above, and where

is a compound, other than a 2:4-diarylpyrrole, containing a reactive methylene group. If compounds containing more than one reactive methylene group are used, then, as will be understood, more than one molecular proportion of the carbonyl compound will react therewith.

In carrying the process of the invention into effect, the ingredients are brought into reaction by methods known to be effective in bringing about condensations with the particular compound containing the reactive methylene group which is being used. Mixing or heating together in a mutual solvent is frequently sufficient. A preferred method, in many cases, is to heat the reagents together in a mutual solvent, for example ethanol, in the presence of a base, for example piperidine, which increases the speed of the condensation. The products may be isolated and purified by conventional methods.

The new colouring matters are varied in colour and may be used as pigments and for other colouring purposes. In the form of water-soluble derivatives, for example salts, sulphonic acid derivatives or salts of these, the new colouring matters may be used for dyeing.

Water-soluble derivatives may be obtained by forming salts of those of the colouring matters which are sufficiently basic, for example, with sulphamic acid, by forming quaternary ammonium salts (when quaternary salt-forming groups are present), or by sulphonation of the colouring matters to yield sulphonic acid derivatives which are in themselves, or in the form of their salts, soluble in water. Alternatively, water-soluble derivatives may be obtained by using as one or both of the ingredients a compound containing one or more water-solubilising groups, for example sulphonic acid groups.

The invention is illustrated but not limited by the following examples, in which the parts are expressed by weight:

*Example 1*

A mixture containing 1.79 parts of N-methyloxindole, 3.0 parts of 5-formyl-2:4-diphenylpyrrole, 50 parts of ethanol, and 0.25 part of piperidine is boiled with stirring for 1½ hours. When cold, the orange red crystalline product which has separated is collected. The product is recrystallised from benzene; a yield 2.64 parts is obtained.

The new product may be sulphonated by dissolving 3.76 parts in 20 parts of concentrated sulphuric acid and adding 9.0 parts of sulphuric containing 20% of its weight of sulphur trioxide. The sulphonated product, which is water-soluble, dyes wool in bright orange shades.

*Example 2*

A mixture containing 3.4 parts of 2-quinaldine methiodide, 2.95 parts of 5-formyl-2:4-diphenyl-pyrrole, 50 parts of ethanol and 0.25 part of piperidine is boiled for 6 hours. The dark red crystalline iodide, which separates, is collected, washed with a little methanol and dried. A yield of 5.2 parts is obtained. The product may be recrystallised from a mixture of 1 part water and 2 parts β-ethoxyethanol.

A solution of the iodide in a mixture of water and β-ethoxyethanol is converted into a deep violet solution of the anhydro base by the addition of aqueous caustic soda.

The base is isolated by diluting the solution with water. On treatment with sulphamic acid the base gives the sulphamate, which is soluble in water, and which dyes tannin-mordanted cotton in bluish-red shades.

In our copending application Serial Number 494,119 filed July 9, 1943, there are described tetra-aryldipyrrolemonomethines and their preparation.

We claim:

1. An asymmetrical chemical compound which contains a single 2:4-diaryl-pyrrole nucleus and has the general formula:

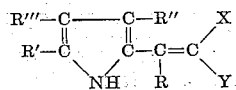

where R' and R'' stands for aryl radicals, R''' is a member of the group consisting of hydrogen, aryl-, alkyl-, alkylamino-, benzylideneamino-, and acylamino-, R is a member of the group consisting of hydrogen, alkyl-, aralkyl-, aryl-, and heterocyclic radicals and

stands for the divalent radical of a reactive methylene compound which remains after splitting off the two reactive hydrogen atoms and wherein X and Y constitute the atoms necessary to complete said radical.

2. A process which comprises causing to interact two compounds one only of which contains a 2:4-diaryl-pyrrole nucleus and has the general formula:

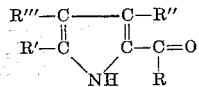

where R' and R'' stands for aryl radicals, R''' is a member of the group consisting of hydrogen, aryl-, alkyl-, alkylamino-, benzylideneamino-, and acylamino-, R is a member of the group consisting of hydrogen, alkyl-, aralkyl-, aryl-, and heterocyclic radicals and the other is a reactive methylene compound containing at least one reactive methylene group and recovering an asymmetrical chemical compound which contains a single 2:4-diaryl-pyrrole nucleus and has the general formula:

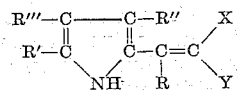

where the R's have the aforesaid significance and where

stands for the divalent radical of said reactive methylene compound which remains after splitting off the two reactive hydrogen atoms and wherein X and Y constitute the atoms necessary to complete said radical.

3. A process which comprises reacting 5-formyl-2:4-diphenylpyrrole with 2-quinaldine methiodide.

ERIC PAUL GOODINGS.
MAURICE ARTHUR THOROLD ROGERS.

REFERENCES CITED

The following references are of record in the file of this patent:

Richter, Textbook of Organic Chemistry, page 653. N. Y., J. Wiley & Sons, 1938. Copy in Lib. of Congress.

Chem. Abstracts, vol. 30, pages 5980–1, citing: J. Am. Chem. Soc., vol. 58, pages 1081–1090.